(12) United States Patent
Medlar et al.

(10) Patent No.: US 8,579,010 B2
(45) Date of Patent: Nov. 12, 2013

(54) SUNSHADE HOOK

(75) Inventors: Troy Medlar, Marysville, OH (US); Shinichi Yamase, Dublin, OH (US)

(73) Assignee: Honda Motor Co., Ltd, Tokyo (JP)

( * ) Notice: Subject to any disclaimer, the term of this patent is extended or adjusted under 35 U.S.C. 154(b) by 64 days.

(21) Appl. No.: 13/043,087

(22) Filed: Mar. 8, 2011

(65) Prior Publication Data

US 2012/0228896 A1   Sep. 13, 2012

(51) Int. Cl.
*A47H 13/00* (2006.01)

(52) U.S. Cl.
USPC ................ 160/368.1; 160/370.21; 296/97.9

(58) Field of Classification Search
USPC ............. 160/370.22, 370.21, 290.1; 24/369; 296/97.9, 97.1, 97.7, 97.6, 97.8; 248/309.1, 222.11, 226.11, 690
See application file for complete search history.

(56) References Cited

U.S. PATENT DOCUMENTS

| | | | | |
|---|---|---|---|---|
| 2,594,813 A * | 4/1952 | Seibert | ........................... | 160/120 |
| 3,183,033 A * | 5/1965 | Stulbach | ....................... | 296/97.2 |
| 4,335,773 A * | 6/1982 | Masi | .............................. | 160/23.1 |
| 4,762,358 A * | 8/1988 | Levosky et al. | .............. | 296/97.7 |
| 4,869,542 A | 9/1989 | Lin | | |
| 5,024,479 A * | 6/1991 | Bryngelson | .................. | 296/97.7 |
| 5,358,299 A | 10/1994 | Seto | | |
| 5,411,310 A | 5/1995 | Viertel et al. | | |
| 5,507,545 A * | 4/1996 | Krysiak | ........................ | 296/97.9 |
| 5,560,575 A | 10/1996 | Krysiak | | |
| 5,560,669 A | 10/1996 | Gute | | |
| 5,687,420 A * | 11/1997 | Chong | ................................ | 2/10 |
| 5,765,896 A * | 6/1998 | Grisval | ......................... | 296/97.9 |
| 5,816,642 A * | 10/1998 | Wilson | ......................... | 296/97.9 |
| 5,918,927 A * | 7/1999 | Renahy et al. | ................ | 296/97.9 |
| 6,196,756 B1 | 3/2001 | Leverger | | |
| 6,324,732 B1 | 12/2001 | Arisaka | | |
| 6,347,775 B1 | 2/2002 | Edlinger | | |
| 6,368,009 B1 | 4/2002 | Noda | | |
| 6,491,333 B2 | 12/2002 | Ichikawa | | |
| 7,189,112 B2 | 3/2007 | Hamaguchi | | |
| 7,401,840 B2 | 7/2008 | Schnoblen | | |
| 7,438,341 B1 * | 10/2008 | Olson, Jr. | ..................... | 296/97.9 |
| 7,798,552 B2 * | 9/2010 | Takai | ........................... | 296/97.9 |
| 8,141,832 B2 * | 3/2012 | Chak | ......................... | 248/226.11 |
| 2002/0092958 A1* | 7/2002 | Lusk | ............................. | 248/339 |
| 2007/0029058 A1* | 2/2007 | Lin | ............................. | 160/370.22 |
| 2007/0063124 A1 | 3/2007 | Kouchi | | |
| 2007/0099452 A1 | 5/2007 | Okada | | |
| 2007/0253796 A1 | 11/2007 | Kawai | | |
| 2008/0141501 A1 | 6/2008 | Kuroda | | |
| 2008/0150316 A1* | 6/2008 | Welter | ......................... | 296/97.9 |
| 2008/0301915 A1 | 12/2008 | Lesecq | | |
| 2009/0066109 A1* | 3/2009 | Hobson et al. | ............... | 296/97.9 |

FOREIGN PATENT DOCUMENTS

| | | |
|---|---|---|
| JP | 10-58971 | 3/1998 |
| JP | 2001-260651 | 9/2001 |
| JP | 2001-322426 | 11/2001 |
| JP | 2006-306295 | 11/2006 |
| JP | 2010-184672 | 8/2010 |

* cited by examiner

*Primary Examiner* — Katherine Mitchell
*Assistant Examiner* — Johnnie A Shablack
(74) *Attorney, Agent, or Firm* — Fay Sharpe LLP

(57) ABSTRACT

A sunshade hook is provided which has an improved hook shape configuration that overlaps the rod-shaped member of the sunshade to prevent inadvertent pullout. An access passage is modified and dimensional relationships established between the hook and the sunshade to prevent inadvertent removal. The stem is also modified to increase the perimeter engagement with an opening in the bracket and increase the ability to withstand shearing stress imposed by wind forces.

18 Claims, 5 Drawing Sheets

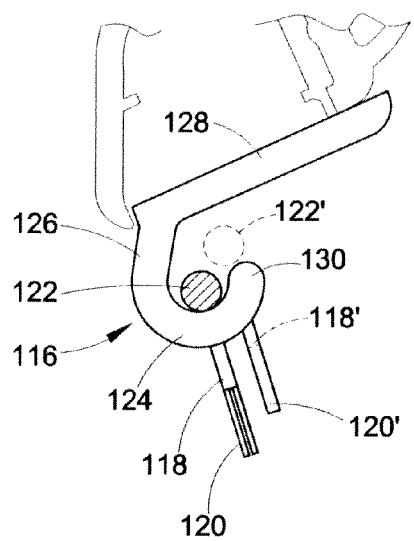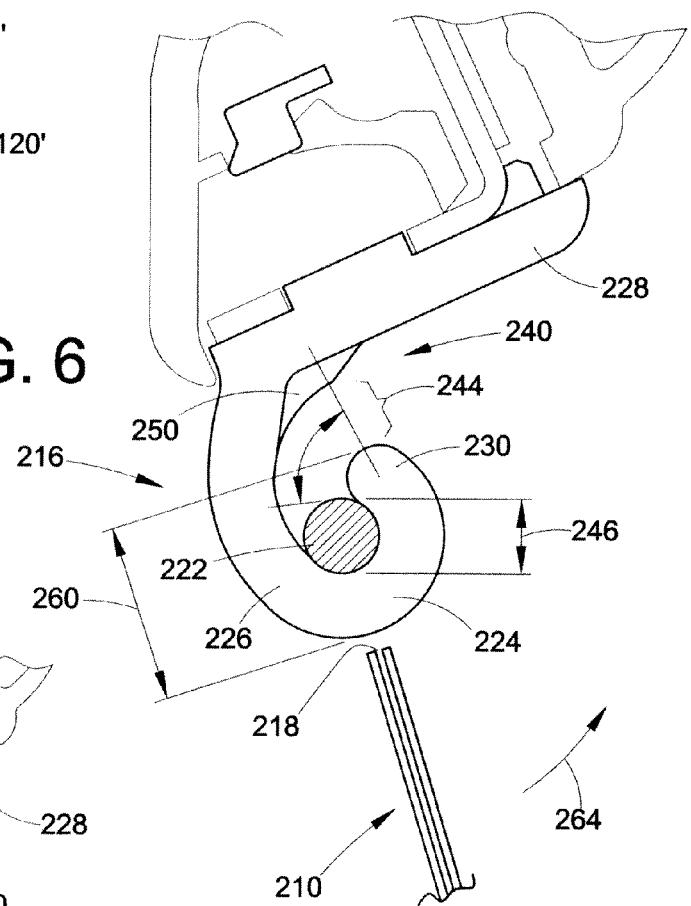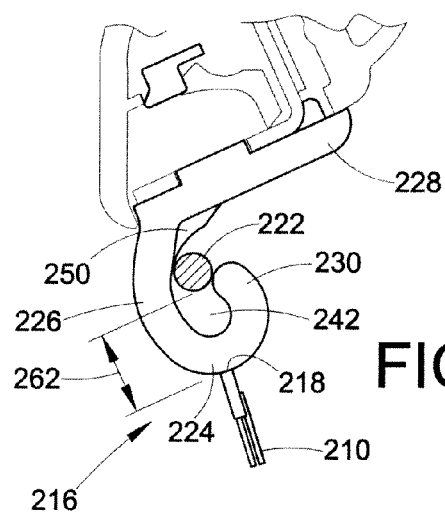

SUNSHADE HOOK

BACKGROUND

This disclosure is directed to a sunshade, and particularly to a sunshade hook assembly or sunshade hook associated with rear door sunshades in a vehicle. At least selected aspects may find application in related environments and applications.

One or more hooks are typically mounted along an upper portion of a frame forming a window opening, for example, in a vehicle door. A flexible sunshade is typically stored in a rolled fashion adjacent a top region of a door lining near a base portion of the window opening. The sunshade is configured to be selectively lifted upwardly from the door lining and extended or deployed by a customer toward the hooks at the upper portion of the window opening. When lifted or deployed in this fashion, reinforced openings formed in the sunshade along an upper edge thereof are dimensioned for mounting receipt on the hooks adjacent the top of the window opening. Occasionally under certain conditions, the sunshade can become unhooked when disposed in a deployed condition. This inadvertently occurs, for example, if a customer is driving with a rear window in a down or open position, and appears to be more particularly associated with a situation where an opposite front window of the vehicle is also in a down or open condition. As a result of the open windows, the front portion of the sunshade can become unhooked while a rear portion or remainder of the extended sunshade remains secured to the hook. This action subjects the sunshade and associated hooks to additional forces as a result of the wind blowing.

Under extreme conditions, the hook may break in response to these additional forces. It has been determined that the rear hook oftentimes breaks of the first and second hooks that secure the sunshade over the rear window opening. Breaking the rear hook most often occurs because the airflow in the vehicle tends to unhook the front portion of the sunshade. Additional forces are then imposed on the rear hook, particularly a twisting torque is applied to the rear hook by the rear potion of the sunshade as a result of the front portion of the sunshade becoming unhooked. It was also determined that breakage typically occurred along the hook rather than the sunshade.

Accordingly, it has been determined that modifications would be helpful with regard to the structure and design of the sunshade hook in order to limit the prospect for the sunshade becoming unhooked and preventing the hook from breaking, and that also enhances the ability of the sunshade assembly to withstand the force and stress imposed on the sunshade hook and associated bracket even if one portion of the sunshade becomes unhooked and additional forces are imposed on the remaining hook.

SUMMARY

A sunshade assembly for an associated vehicle includes a sunshade having a rod-shaped member adjacent a first edge. The rod-shaped member has a cross-sectional dimension adapted for receipt in a generally J-shaped hook formed by a leg portion extending from a mounting base portion, and a generally curvilinear portion extending from the leg portion toward a terminal end that forms a substantially closed cavity that receives the rod-shaped member of the sunshade therein. The sunshade includes an opening formed adjacent the rod-shaped member that defines a sunshade dimension extending between the rod-shaped member and an opposite edge of the opening. The terminal end of the hook is spaced from the base portion by an access passage dimension slightly greater than the cross-sectional dimension of the rod-shaped member and defines an access passage that opens into the cavity. The sunshade dimension is less than a retention dimension extending between the terminal end of the hook and an external bight portion of the hook to preclude inadvertent removal of the rod-shaped member from the cavity.

The access passage is preferably formed by substantially parallel surfaces of the base portion and terminal end of the hook. The spacing between the parallel surfaces extends through an angle of approximately 90°.

A curvilinear portion of the hook extends over greater than 180° from the leg portion so that the terminal end of the hook at least partially overlaps the rod-shaped member of the sunshade.

The base portion includes a stem with a generally rectangular cross-sectional conformation that includes deflectable clips that extend outwardly from substantially opposite corner regions of the stem.

The stem preferably includes first and second perimeter regions interposed between the first and second deflectable clips, where each of the perimeter regions extends continuously from a mid-length position on one side past a mid-length position on a contiguous side of the stem.

One benefit is the improved stiffness around the clip portion.

Still another benefit resides in the increased cross-sectional area of the stem which improves the toughness of the shearing stress.

The preferred configuration of the hook overlaps the rod to limit the prospects of the rod from inadvertently travelling vertically out of the hook cavity.

A slight interference is encountered upon removal of the sunshade from the hook to help keep the rod-shaped member in place.

Still other benefits and advantages of the present disclosure will become more apparent from reading and understanding the following detailed description.

BRIEF DESCRIPTION OF THE DRAWINGS

FIG. 3 is a view of a rod-shaped member of a sunshade received in a hook in a prior art arrangement.

FIG. 6 is a view of the rod-shaped member of the sunshade received in the hook of FIGS. 4 and 5.

FIG. 7 is a view similar to FIG. 6 illustrating the improved retention abilities of the hook.

DETAILED DESCRIPTION

Figure 1:
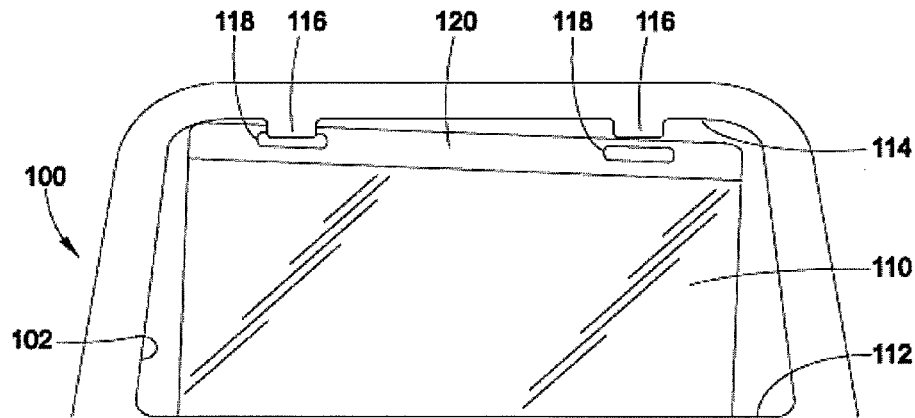
FIG. 1 is an elevational view of a rear window with a sunshade in a deployed condition.
Figure 2:
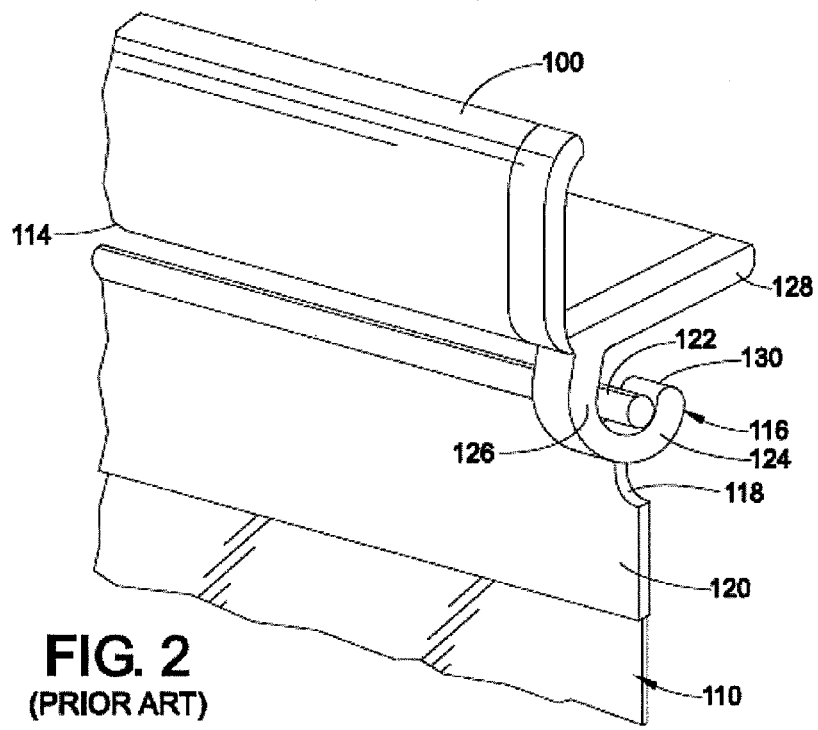
FIG. 2 is a perspective, partially sectional view of a prior art arrangement of a sunshade secured to a hook.

Turning first to FIG. 1, a portion of a vehicle, specifically a rear door 100 having a window opening 102 formed in the door, is shown. A sunshade 110 is shown in a partial, almost fully open or deployed condition where a flexible fabric member that forms the sunshade is extended into a generally planar condition from a first or lower edge 112 of the window opening to a second or upper edge 114 of the window opening. Along the second edge of the window opening are provided plural hooks 116 (shown here as preferably first and second hooks) which are adapted for receipt in associated openings 118 of the sunshade. More particularly, a reinforced edge 120 of the sunshade 110 includes a rod-shaped member 122 which is dimensioned for receipt in the J-shaped hook 116 (FIG. 2). Thus, the rod-shaped member 122 is received within a lower, bight portion 124 of the hook. The bight portion 124 of the hook is interposed between a first leg 126 extending outwardly from base portion 128 and terminal end portion 130 of the hook. In a storage position of the sunshade (not shown), the flexible sunshade fabric 110 is typically stored in a rolled form around a spring-biased core, which spring-bias urges the sunshade into a normally closed position wound around the core disposed in the door beneath the lower edge of the window opening and only a minimal portion of the sunshade extending upwardly for grasping by the user. When the user wishes to deploy the sunshade, the reinforced edge of the sunshade (or some other structure that facilitates grasping the sunshade) is pulled upwardly until the openings 118 are mounted on the hooks 116 as generally shown in FIGS. 1 and 2.

As described in the Background, under certain conditions, the sunshade 110 can become disconnected from one of the hooks 116, which can potentially lead to breakage of the hook 116 or sunshade 110. This problem is particularly acute when the window is open and the vehicle is being driven at a higher speed while the sunshade is held on one of the hooks (see FIG. 1). Thus, as shown in FIG. 3, when the sunshade 110 is deployed and properly seated in the bight 124 of the J-shaped hook 116, the bias of the storage spring (not shown) exerts a downward force on the sunshade and retains the rod-shaped member 122 in the bight portion 124 of the hook. However, forces on the sunshade, for example as imposed by an open window when the vehicle is driven, can lift the rod-shaped member 122 to the position shown as 122' (FIG. 3) where the opening 118' in the reinforced portion 120' is lifted up and over the terminal end 130 of one or more of the hooks 116. This could lead to a condition as shown in FIG. 1 where the sunshade 110 is originally retained on each of the hooks and one of the openings 118 of the sunshade 110 works loose from an associated hook which can potentially lead to breaking the hook or the sunshade.

The subject new arrangement of FIGS. 4-7 illustrates a new sunshade hook or hook assembly 216 that overcomes these noted problems. Particularly, the new sunshade hook 216 has a generally J-shape formed by a first or leg portion 226 that extends from a mounting or base portion 228 through bight region 224 to a terminal end 230. As is evident in FIGS. 4-7 when the new hook 216 is compared to the prior art hook 116, the configuration of the J-shaped hook 216 includes a longer or extended leg portion 226 and a greater degree of curvature of the terminal end 230 toward the leg portion 226 so that it is more difficult for the rod-shaped member 222 to be inadvertently removed from the bight region 224 and over the terminal end 230. More particularly, access passage 240 provides selective access to internal hook cavity 242 and the access passage preferably has an access passage dimension 244 that receives the rod-shaped member 222 therethrough for access to the internal cavity 242 of the J-shaped hook 216. The substantially closed cavity 242 is defined by the leg portion 226, bight portion 224, and terminal end 230, and the terminal end curves a greater degree toward the leg portion than the prior art arrangement so that the hook 216 further confines the rod-shaped member 222 in the cavity. The access passage dimension 244 is slightly greater than the cross-sectional dimension 246 of the rod-shaped member to allow the rod-shaped member to pass therethrough, and also reduce the potential for the sunshade to be inadvertently removed from the cavity 242.

Preferably, a rib 250 angles inwardly from an intersection of the base portion 228 with the leg portion 226 to more particularly control the dimension 244 of the access passage 240. In the preferred arrangement, the rib extends over only a portion of the width of the hook. Moreover, the rib is centered between opposite ends in the hook cavity. Thus, the spacing between the rib and the curved terminal end potion 230 of the hook is substantially constant in a generally counter-clockwise direction through approximately 90°. The rib 250 and leg portion 226 maintain a generally constant spacing therebetween (sometimes referred to herein as a "parallel" relation) with the contour of the terminal end 230 of the hook 226 and that access passage dimension 244 is only slightly greater than the cross-sectional dimension 246 of the rod-shaped member.

Another improvement is particularly illustrated in FIGS. 6-7 where a retention dimension 260 (FIG. 6) defined between the terminal end 230 and an external surface of the bight portion 224 is greater than a sunshade dimension 262 (see FIG. 7 where the sunshade dimension is measured between the rod-shaped member 222 and an edge of the opening 218 opposite the rod-shaped member. This dimensional relationship between the retention dimension 260 and the sunshade dimension 262 prevents inadvertent removal of the rod-shaped member 222 of the sunshade from the hook cavity 242. That is, as illustrated in FIG. 7, the surface of the reinforced portion defined at opening 218 is spaced from the rod-shaped member 222 by the sunshade dimension 262 to provide contact with the hook if the rod-shaped member is lifted vertically upward from the bight toward the access passage. This contact between the hook and the opening edge 218 of the sunshade prevents inadvertent removal of the sunshade as represented in FIG. 7. Instead, the sunshade must be rotated (in a generally counter-clockwise direction as illustrated by reference arrow 264 in FIG. 6) about the rod-shaped member seated in the hook cavity until the sunshade 210 approaches the terminal end 230 and the rod-shaped member can be removed through the access passage. As will be appreciated, this controlled, purposeful movement of the sunshade and rod-shaped member is not inadvertent and is undertaken by the user to mount and remove the rod-shaped member through the access passage 240 of the hook. Further, it is unlikely that this orientation of the sunshade relative to the access passage of the hook will be randomly encountered as a result of the force of the wind, for example, and therefore the sunshade will be maintained in a stable position in the hook.

In addition, the curvilinear portion of the hook that continues from the leg portion 226 toward the terminal end 230 preferably extends over greater than 180° from the leg portion. In this manner, the terminal end of the hook at least partially overlaps the rod-shaped member of the sunshade in the mounted position (see FIG. 6). This extended curvature of the hook 216 further contributes to retaining the rod-shaped member 222 in the hook cavity and prevents inadvertent removal.

Figure 8:
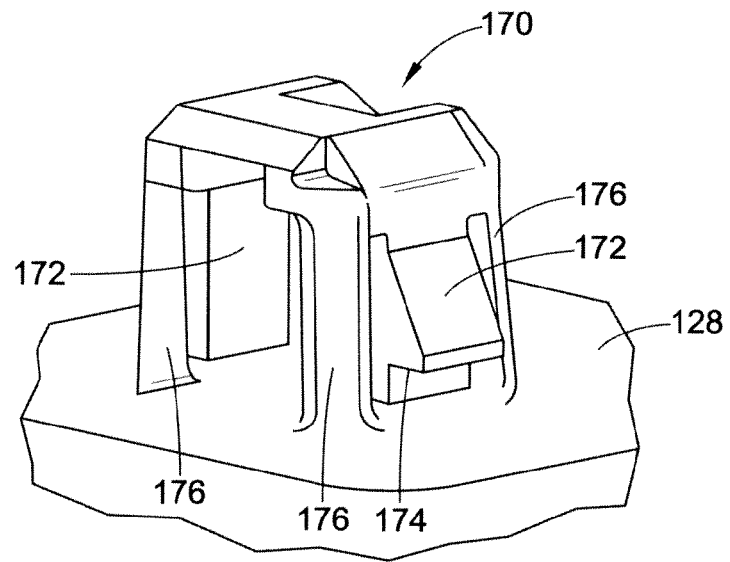
FIG. 8 is a perspective view of a prior art stem portion of the hook.
Figure 9:
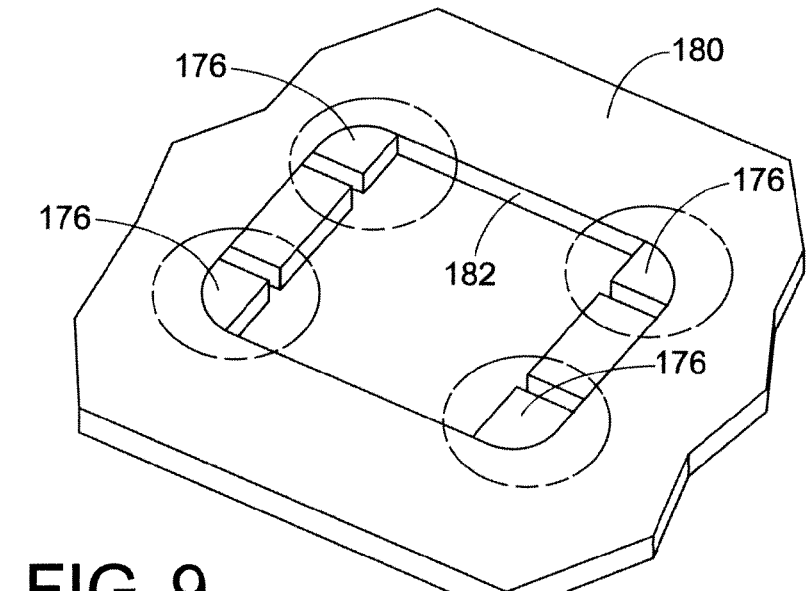
FIG. 9 is an underside, sectional view showing connecting regions of the prior art stem portion with a mounting bracket.

In the prior art arrangement of FIGS. 8 and 9, a stem 170 extends from the base portion 128 of the hook in a direction generally opposite of the J-shaped hook for receipt in mounting bracket 180. Deflectable legs 172 extended from opposite sides of the stem 170 to form undercut shoulder portions 174 that engage or snap-fit through an opening 182 in the bracket. Four corner regions or posts 176 abuttingly engaged the opening 182 in the bracket 180 (FIG. 9), and thus the mounting rigidity and contact between the stem 170 of the hook and the bracket 180 was generally confined to these corner regions 176, along with the deflectable undercut shoulders 174.

Figure 4:
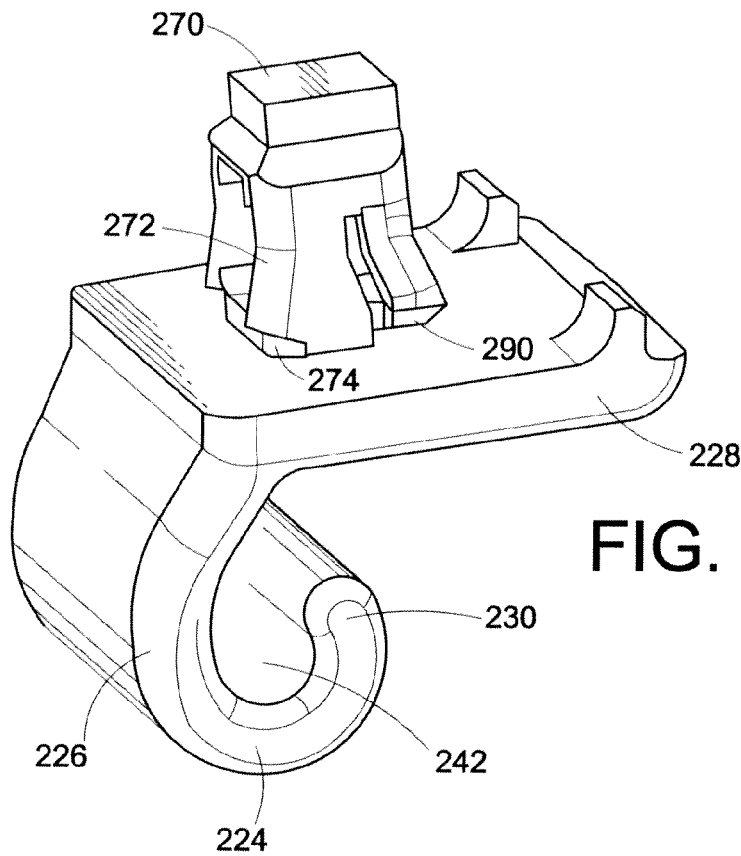
FIG. 4 is a perspective view of the subject new sunshade hook.
Figure 5:
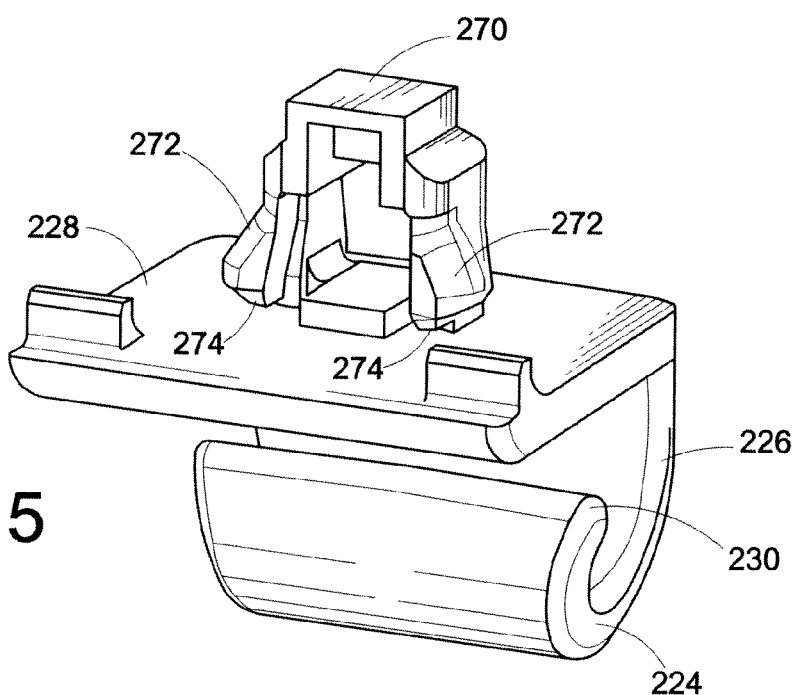
FIG. 5 is another perspective view of the new sunshade hook of FIG. 4.
Figure 10:
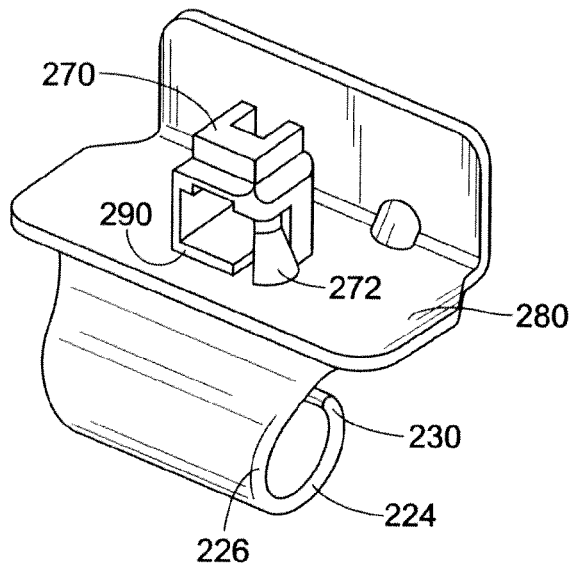
FIG. 10 is a perspective view of the new hook received in a mounting bracket.
Figure 11:
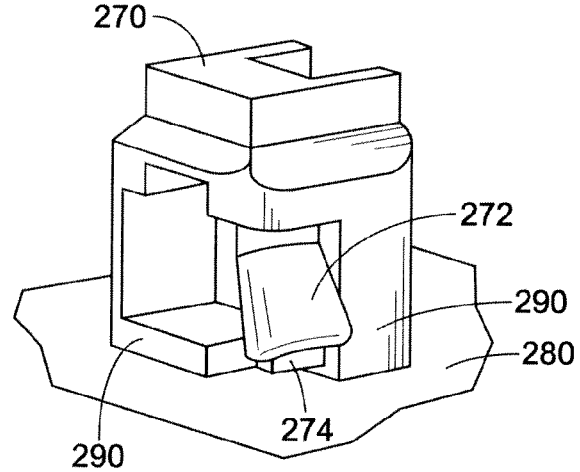
FIG. 11 is a perspective view of the stem portion of the new hook.
Figure 12:
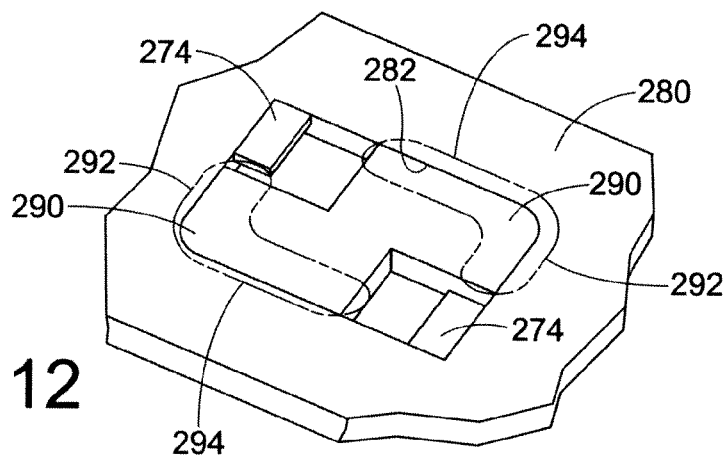
FIG. 12 is a sectional view showing engagement of the stem portion through an opening in the mounting bracket.

As illustrated in FIGS. 4 and 5, and more particularly shown in FIGS. 10-12, deflectable legs 272 of the new hook are moved toward opposite corner regions 290 of stem 270 so that a pair of enlarged corners 290 engage opening 282 in the bracket 280. That is, first and second perimeter regions of the stem 270 extend continuously from a mid-length position on one side (292 in FIG. 12) past a mid-length position 294 on a contiguous side of the stem 270. In this manner, the deflectable legs 272 extend from substantially opposite corner regions and are configured for receipt through the generally rectangular opening 282 in the bracket, snap outwardly so that retaining shoulders 274 engage the bracket, and position the enlarged corner regions 290 for a substantially enlarged perimeter engagement 292, 294 with the bracket 280. This adds desired strength and rigidity to the structure in order to counteract shear stresses imposed on the hook when the deployed sunshade is received in the hook and is subjected to twisting forces.

In conclusion, the hook shape is made parallel in the access passage region between the rib 250 and the terminal end 230 through approximately 90° to keep the rod-shaped member 222 in the cavity 242 of the hook. This configuration makes it more difficult for the rod-shaped member to travel a parallel path accidently or inadvertently, e.g., as a result of the wind blowing. The extended curvature of the terminal end 230 overlapping the rod-shaped member also advantageously retains the rod-shaped member and prevents the rod-shaped member from travelling vertically outward of the cavity when the wind is blowing. The retention dimension between the terminal end of the hook and the outer surface of the bight is greater than the sunshade dimension measured between the rod-shaped member and the sunshade opening so that a slight interference upon insertion and removal is developed which helps maintain the rod-shaped member in the hook. Further, the stem 270 is modified to maximize rigidity and contact area with the opening in the bracket. Stiffness is improved by increasing the cross-sectional area of the stem which engages the bracket 280 and improves the toughness or level of shearing stress which the stem and bracket can withstand. Thus, the effective cross-sectional perimeter area 292, 294 that the stem engages in the bracket opening is enlarged to improve the ability to withstand this shearing stress.

The disclosure has been described with reference to preferred embodiments. Obviously, modifications and alterations will occur to others upon reading and understanding the preceding detailed description. It is intended that the disclosure be construed as including all such modifications and alterations.

We claim:

1. A sunshade assembly for an associated vehicle comprising:
   a sunshade having a rod-shaped member adjacent a first edge thereof, the rod-shaped member having a cross-sectional dimension, and the sunshade having an opening formed adjacent the rod-shaped member, wherein said opening defines a sunshade dimension extending between the rod-shaped member and an opposite edge that forms the opening; and
   a hook having a generally J-shape formed by a leg portion extending from a mounting base portion, and a generally curvilinear portion extending from the leg portion toward a terminal end forming a substantially closed cavity that selectively receives the rod-shaped member therein, the terminal end being spaced from the base portion and defining an access passage that opens into the cavity by an access passage dimension slightly greater than the cross-sectional dimension of the rod-shaped member and, a retention dimension extending between the terminal end and an external surface of the bight portion of the hook being greater than the sunshade dimension to preclude inadvertent removal of the rod-shaped member from the cavity such that the sunshade must be rotated about the rod-shaped member seated in the hook cavity until the sunshade approaches the terminal end and the rod-shaped member is removed through the access passage.

2. The sunshade assembly of claim 1 wherein the hook is configured for mounting adjacent a window of the associated vehicle.

3. The sunshade assembly of claim 1 wherein the base portion has a stem with a generally rectangular cross-sectional conformation that includes first and second deflectable clips that extend outwardly from substantially opposite corner regions, the base portion being configured for receipt through a generally rectangular opening in an associated bracket.

4. The sunshade assembly of claim 3 wherein the stem includes first and second perimeter regions interposed between the first and second deflectable clips, each of the first and second perimeter regions extending continuously from a mid-length position on one side past a mid-length position on a contiguous side.

5. The sunshade assembly of claim 1 wherein the access passage is formed by substantially parallel surfaces of the base portion and terminal end of the hook.

6. The sunshade assembly of claim 5 wherein the substantially parallel surfaces remain substantially parallel through an angle of approximately ninety degrees.

7. The sunshade assembly of claim 6 wherein the curvilinear portion of the hook extends over greater than one hundred eighty degrees from the leg portion so that the terminal end of hook at least partially overlaps the rod-shaped member of the sunshade.

8. The sunshade assembly of claim 1 further comprising a rib extending inwardly from the leg portion into the cavity.

9. The sunshade assembly of claim 8 wherein the rib extends over only a portion of a width of the leg portion.

10. The sunshade assembly of claim 9 wherein the rib is generally centered along the width of the leg portion.

11. A sunshade assembly for an associated vehicle comprising:
    a sunshade mounted to the vehicle along a lower edge of a window opening for selective deployment to substantially cover the window opening, the sunshade having a rod-shaped member adjacent an upper, first edge thereof, the rod-shaped member having a cross-sectional dimension, and the sunshade having an opening formed adjacent the rod-shaped member and that defines a sunshade dimension extending between the rod-shaped member and an opposite edge that forms the opening; and a hook mounted to the vehicle along an upper edge of the window opening having a generally J-shape configured to receive the rod-shaped member of the sunshade in the deployed position of the sunshade, the hook including a leg portion extending from a mounting base portion, and a generally curvilinear portion extending from the leg portion toward a terminal end forming a substantially closed cavity that selectively receives the rod-shaped member therein, the terminal end spaced from the base portion and defining an access passage that opens into the cavity formed by substantially parallel surfaces of the base portion and terminal end of the hook wherein the substantially parallel surfaces remain substantially parallel through an angle of approximately ninety degrees, the access passage defining an access passage dimension slightly greater than the cross-sectional dimension of the rod-shaped member, the terminal end and an external surface of the bight portion at a base of the hook define a retention dimension extending therebetween that is greater than the sunshade dimension to preclude inadvertent removal of the rod-shaped member from the cavity.

12. The sunshade assembly of claim 11 wherein the curvilinear portion of the hook extends over greater than one hundred eighty degrees from the leg portion so that the terminal end of hook at least partially overlaps the rod-shaped member of the sunshade.

13. The sunshade assembly of claim 11 wherein the base portion has a stem with a generally rectangular cross-sectional conformation that includes deflectable legs that extend outwardly from substantially opposite corner regions, the base portion configured for receipt through a generally rectangular opening in an associated bracket.

14. The sunshade assembly of claim 13 wherein the stem includes first and second perimeter regions interposed between the first and second deflectable legs, each of the first and second perimeter regions extending continuously from a mid-length position on one side past a mid-length position on a contiguous side.

15. The sunshade assembly of claim 11 further comprising a rib extending inwardly from the leg portion into the cavity.

16. The sunshade assembly of claim 15 wherein the rib extends over only a portion of a width of the leg portion.

17. The sunshade assembly of claim 15 wherein the rib is generally centered along the width of the leg portion.

18. A sunshade assembly for a motor vehicle comprising:

a sunshade having a rod-shaped member adjacent a first edge thereof, the rod-shaped member having a cross-sectional dimension, and the sunshade having an opening formed adjacent the rod-shaped member and that defines a sunshade dimension extending between the rod-shaped member and an opposite edge that forms the opening; and a hook having a generally J-shape formed by a leg portion extending from a mounting base portion, and a generally curvilinear portion extending from the leg portion toward a terminal end and forming a substantially closed cavity that selectively receives the rod-shaped member therein, the terminal end being spaced from the base portion and defining an access passage that opens into the cavity by an access passage dimension slightly greater than the cross-sectional dimension of the rod-shaped member; and a stem having deflectable legs with retaining shoulders that extend outwardly from substantially opposite corner regions, the stem including enlarged first and second perimeter regions interposed between the first and second deflectable legs, each of the enlarged first and second perimeter regions extending continuously from a mid-length position on one side past a mid-length position on a contiguous side for receipt through an opening in an associated bracket so that the retaining shoulders of the deflectable legs engage the associated bracket, and the enlarged first and second perimeter regions engage respective enlarged perimeter regions of the associated bracket opening to counteract shear stresses.

* * * * *